Dec. 30, 1969    D. P. HAMBLEN    3,486,808
GRADIENT REFRACTIVE INDEX OPTICAL LENSES
Filed March 14, 1966    3 Sheets-Sheet 1

DAVID P. HAMBLEN
INVENTOR.

BY Lowell G. Wise
ATTORNEY

Dec. 30, 1969  D. P. HAMBLEN  3,486,808
GRADIENT REFRACTIVE INDEX OPTICAL LENSES
Filed March 14, 1966  3 Sheets-Sheet 2

DAVID P. HAMBLEN
INVENTOR.

BY
Lowell J. White
ATTORNEY

Dec. 30, 1969  D. P. HAMBLEN  3,486,808
GRADIENT REFRACTIVE INDEX OPTICAL LENSES
Filed March 14, 1966  3 Sheets-Sheet 3

DAVID P. HAMBLEN
INVENTOR.

BY *Lowell J. Wise*

ATTORNEY

United States Patent Office 3,486,808
Patented Dec. 30, 1969

3,486,808
GRADIENT REFRACTIVE INDEX OPTICAL LENSES
David P. Hamblen, Rochester, N.Y., assignor to Bausch & Lomb Incorporated, Rochester, N.Y., a corporation of New York
Filed Mar. 14, 1966, Ser. No. 534,086
Int. Cl. G02b 1/00
U.S. Cl. 350—175     6 Claims

ABSTRACT OF THE DISCLOSURE

Disclosed is an improved lens consisting of a single body of uniform index of refraction into a major surface of which metal ions have been diffused to produce a change in the index of refraction and subsequently portions of the diffused surface removed to yield a lens containing portions of different index of refraction with a uniform index gradient therebetween. Also disclosed in a process for manufacturing the lens of this invention. With the teaching of this invention it is possible to correct a single lens for defects such as "coma" or "spherical aberration."

The present invention relates to optical elements and to a process for treating solid optical preforms to effect a change in the refractive index of portions of the optical surface by a diffusion process. The methods used in this invention may be applied to preformed refractive surfaces of glass optical elements, and in the preferred embodiment of the invention a glass surface is contacted with a molten metal compound and alkali ions from the glass are exchanged with metal ions from the molten compound, resulting in a uniform increase in the refractive index at the surface of the glass body. Thereafter, portions of the treated refractive surface are removed to produce a lens element having a non-homogeneous refractive surface.

It has been known to the prior art that changes in refractive index of a solid matrix such glass or sapphire may be effected by altering the chemical composition at the surface of the matrix by contacting the surface with a fluid containing a refractive index-changing material and that the change in refractive index may vary from a high degree of change at the surface to a low degree of change by diffusing matter into the matrix body. Such processes depend upon thermal migration to obtain a refractive index gradient inwardly from the surface. Particularly valuable processes are those in which a borate or alkali silicate glass preform is contacted with a molten salt containing silver or thallium cations. This is an ion exchange process where the counter-ion, Ag, replaces the co-ion (alkali ion) within the glass. There is no change in the matrix composition of the glass, only replacement of the interstitial ion with a counter-ion possessing a large degree of polarization. This treatment results in a relatively high degree of diffusion into the parent glass matrix, and also the distribution of diffusant cations is predictable and the index gradient can be made approximately linear. The refractive surfaces of the matrix preform prior to treatment may be molded or ground, and portions of the treated surface are removed as by grinding along a contour different from the original surface subsequent to a uniform diffusing of index-changing material. Therefore, deeper portions of the original surface are removed at one part of the surface than at another and the refractive index at the newly-generated surface is non-homogeneous due to the index gradient accompanying diffusion.

Optical elements manufactured by the new process are particularly valuable in applying corrections to aplanatic lens elements having spherical aberration and coma and in the manufacture of lenses having properties similar to complex aspheric surfaces while using simple spherical or flat optically-finished surfaces. Also by the method of this invention ophthalmic lense may be constructed from a single matrix having variable power for multifocal lenses in which simple spherical, and cylindrical, and plano surfaces are generated in the finished ophthalmic product.

Accordingly, it is an object of the present invention to produce a novel optical element comprising a solid body of optical material having continuous refractive surfaces and having a substantially continuous refractive index gradient between surface portions of the optical element.

It is a further object of the present invention to provide methods for producing lens elements in which a refractive index-changing material is diffused into a refractive surface of an optical body and wherein portions of the diffused surface are removed to produce an optical element having a non-homogeneous refractive surface.

It is another object of this invention to provide a method for treating the surface of a solid lens preform by contacting the lens surface with a fluid containing cation material, diffusing the cation material into the matrix and removing portions of the treated surface to produce a lens element having a variable refractive index.

These and other objects and features of the present invention will be apparent in the following description and in the attached drawing wherein.

Figure 1A:
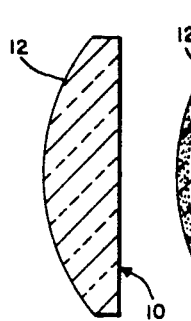
FIGURES 1a to 1c are cross-sectional views of a lens element treated according to the present invention.
Figure 1B:
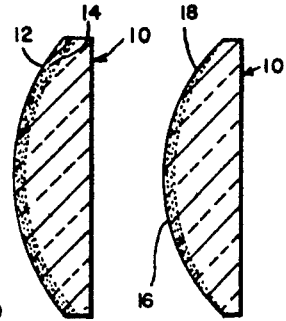
Figure 1C:
Figure 2A:
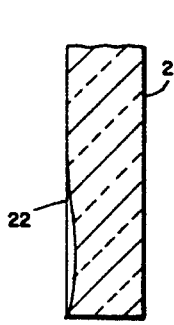
FIGURES 2a to 2c are cross-sectional views in which an aspheric preform is treated with an index-changing material and ground to a flat surface to produce an optical element having aspheric characteristics.
Figure 2B:
Figure 2C:
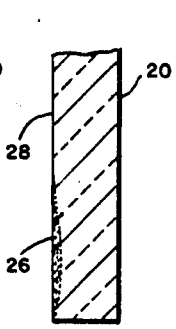

Referring now to FIGURES 1a to 1c, there is shown a solid lens preform 10 of glass having an original spherical surface 12. FIGURE 1b shows a zone 14 in which a refractive index-changing material has been diffused. FIGURE 1c shows the same lens after a grinding operation in which a spherical curve having a radius shorter than that of original surface 12 has been generated. Only a small portion of the surface has been removed at portion 16 resulting in an area of high refractive index, while at the peripheral areas of lens 10 a large portion of the original surface 12 has been removed resulting in areas 18 of relatively-low refractive index, substantially the same as the index of the parent glass 10. In FIGURE 2a a partial cross-sectional view is shown of a Schmidt optical plate 20 having an aspheric surface 22 for correction of spherical aberration when used with a spherical mirror. In the prior art these optical element have been manufactured by grinding the aspheric surface 22 and optically polishing the glass material to the desired optical properties. The difficulties of optically finishing an aspheric surface make these elements extremely expensive; however, when manufactured by the method of this invention, Schmidt optical plate 20 may have its optical refractive surface 22 generated by molding or rough grinding to the desired curvature. As shown in FIGURE 2b, the aspheric surface 22 is treated with a material for uniformly changing the refractive index to produce a diffused zone 24 substantially corresponding to the curvature of surface 22. The Schmidt optical plate is then repolished as shown in FIGURE 2c to produce a new plano refractive surface having an area of high refractive index 26 and an area of low refractive index 28. The resulting plano optical element behaves like an aspheric lens due to the change in the gradient index.

Figure 3:
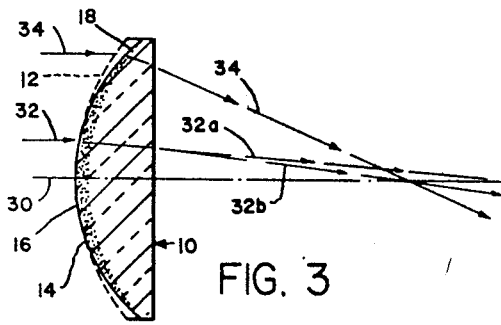
FIGURES 3 and 4 show cross-sectional views of lenses and show ray traces before and after treatment according to the present invention.

FIGURE 3 shows a positive lens element 10 treated as shown in FIGURES 1a to 1c. A series of ray traces are shown in which the ray trace for the original untreated lens for a paraxial ray 32 extends along line 32a passing through a point on center line 30. A marginal ray 34 crosses the center line at the desired focal point both before and after treatment since there is no substantial change in the refractive index at the peripheral areas 18 of the lens. When the glass has been treated with a refractive index-changing material such as silver ions the center portions of lens 10 have an area of increased refractive index 16. Those rays 32 passing through this portion of the lens are refracted more than in an untreated lens of the same curvature and the ray trace 32b of paraxial ray 32 crosses marginal ray 34 and center line 30 at the desired point of common focus. Accordingly, the initial longitudinal spherical aberration of lens elements 10 has been corrected by the diffusion and grinding steps in forming the lens. A similar correction is given for coma and lenses such as shown in FIGURE 3 may be used in numerous optical systems wherein a high degree of accuracy is desired.

Comparative testing of lenses to demonstrate the beneficial effects of the diffusion process for correcting spherical aberration and coma have been performed using a coherent light source. A series of lenses having a common optical matrix material were ground to the same shape and optical surface quality. An untreated lens produced strong visible interference patterns when a collimated beam of 6328 A. light from a helium-neon gas laser was passed through the lens. A controlled series of treated lenses were tested for interference fringes. It was found that an optimum diffusion time for a given matrix composition, treatment temperature and diffusant could be obtained which produced a lens having a minimum of interference fringes, indicating correction of spherical aberration. The improvements realized in correction of coma (optical defects in off-axis image rays) are even more pronounced than for correction of spherical aberration.

Figure 4:
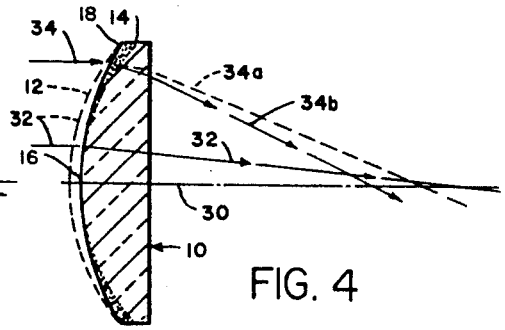

FIGURE 4 shows a similar lens, however, the area of diffused material having an increased refractive index is reground using a larger radius of curvature than the original surface 12, thereby resulting in a higher amount of surface removal adjacent center line 30 than in peripheral areas 18. As an example of this lens the original curve 12 has a dioptric curve of 7.00 and the reground curve after diffusion has a value of 6.50. The dioptric curve is defined by the expression $(n_D-1)/R$, where R is the radius in meters, and $n_D$ is the refractive index of the parent material.

Figure 5:
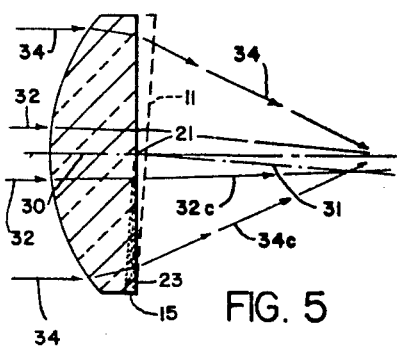
FIGURES 5 and 6 show cross-sectional views of ophthalmic lenses having a continuously-variable power in portions.

FIGURE 5 shows a cross-sectional view of an ophthalmic lens manufactured according to this invention. Instead of diffusing along the spherical surface as shown in FIGURE 1a to 1c a plano surface 11 which is disposed anormal to center line 30 is treated uniformly to create a diffused zone 15. Subsequently the plano surface 11 is reground in a different plane which second plane will be normal to the center line of the lens. The intersection of the two planes should near the normal viewing axis of the lens. This results in a continuous increase of refractive index from the center 21 of the regenerated surface to the periphery 15 of the lens. Accordingly the lower portion of the ophthalmic lens 10 has an increasing power towards its lower edge and a "virtual" axis 31 is established and a continuously variable multifocal area is established in the diffused zone.

Figure 6:
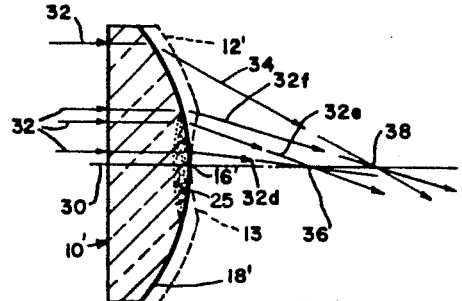

A similar dual-focus lens is shown in FIGURE 6 where a glass lens 10' having an original surface 12' with a convex spherical curve 12' has a concave portion 13 disposed around a center line 30. This lens is treated with molten salt to produce a uniform diffused zone 25 along the complex original surface. The treated surface is reground using a spherical curvature to remove substantially all of the diffusant material around the periphery of the lens adjacent area 18' of low refractive index. An area 16' of high refractive index adjacent the center line lens 10' provides a first image 36 being formed along center line 30. No substantial change in the ray trace 34 at the marginal areas of the lens is noticed; however, substantial changes in the ray traces are realized in the center area 16' having an increased refractive index. The ray traces 32d and 32e derived from paraxial rays 32 converge at point 36 to form the first image while adjacent paraxial ray 32f converges with marginal ray 34 to form the second image at point 38.

Figure 7:
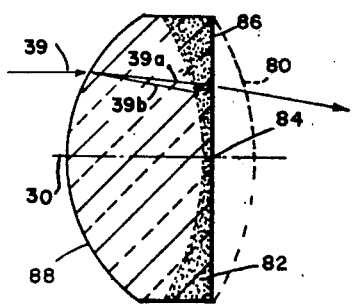
FIGURE 7 is a cross-sectional view of a lens showing chromatic corrections.

FIGURE 7 is a cross-sectional view of a single-matrix optical element having characteristics similar to a doublet lens. Correction for chromatic aberrations in white light 39 impinging upon the lens is achieved in a zone of increased refractive index. Original surface 80 is a spherical surface and is treated with an index-increasing material to form diffused zone 82. A plano surface is ground into the diffused portion 82 and an effective "doublet" is produced having a center area 84 of low refractive index and a peripheral area 86 of increased refractive index. White light 39 is refracted into a continuous spectrum between red ray trace 39a and violet ray trace 39b due to the chromatic dispersion of the parent glass in matrix 88. When these dispersed rays pass through the diffused zone 82 they are recombined and emerge from the rear surface of the lens as white light.

Figure 8:
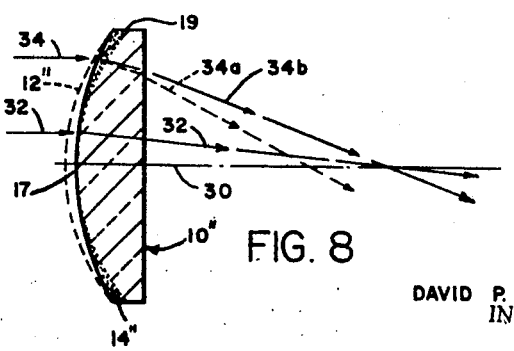
FIGURE 8 shows a cross-sectional view of a lens element having a surface portion of decreased refractive index.

FIGURE 8 represents a lens in which the refractive index of a surface portion 12″ of the lens has been decreased. A decrease in refractive index for a glass matrix may be obtained by exchanging a diffusant cation with a glass cation of lower polarizability. For instance substituting lithium ions for sodium or potassium, or substituting sodium for potassium. Also the index of an alumina preform may be decreased by contacting a sapphire matrix 10″ with vapors of magnesium oxide to produce a diffused portion 14″ containing alumina-magnesia spinel. The spinel has a lower refractive index than the present sapphire matrix 10″. The spinel is soluble in the matrix and forms a refractive index gradient increasing from surface 12″ inwardly. This is opposite to the change in refractive index realized by exchanging ions between a molten salt such as silver chloride and a glass preform such as sodium silicate glass wherein the silver ions increase the refractive index of the parent glass. Accordingly the effects of the diffused portions of the lens shown in FIGURE 8 are opposite to that shown in FIGURE 4. Regrinding removes a major portion of the diffused material in the vicinity of the center line of the lens at area 17 while removing smaller portions of the diffused surface material at peripheral areas 19. The optical effects of this process correct spherical aberration and coma in a manner similar to the lens of FIGURE 3. A process for diffusing alumina-magnesia spinel into a sapphire matrix is described in U.S. Patent 3,212,401 to Navias, issued Oct. 19, 1965.

Figure 9:
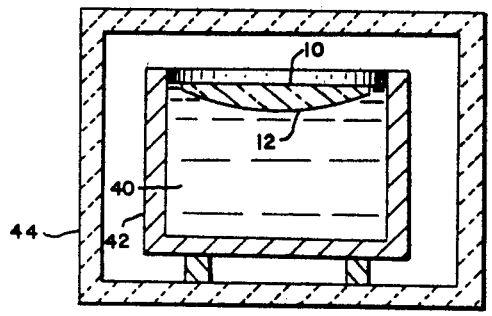
FIGURES 9–13 show apparatus for treating solid optical preforms by diffusion.

In order to completely understand the process a description of the apparatus in which the diffusion steps are carried out is presented. In FIGURE 9 a solid lens preform 10 such as borate glass having a spherical refractive surface 12 is immersed partially in a bath of molten salt 40 contained in a suitable boat 42. Since the glass preform being treated is less dense than the molten salt it will float on its surface. The salt and preform are placed in a temperature-controlled oven 44 and heated to the desired temperature for diffusing ions such as silver, cesium, rubidium or thallium from the molten salt 40 into the matrix surface 12. Thereafter the lens may be ground according to the configurations disclosed in FIGURES 1 to 8.

Figure 10:
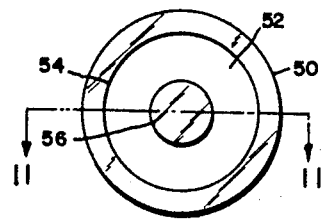
Figure 11:
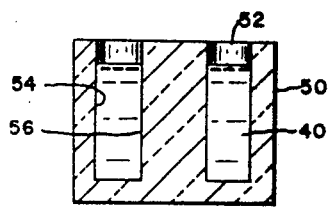
Figure 12:
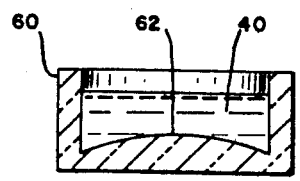

FIGURES 10 and 11 show a diffusion cell 50 such as that disclosed by Rosenbauer in U.S. patent application Ser. No. 517,328 filed Dec. 29, 1965, now abandoned in favor of continuation-in-part application Ser. No. 763,831 filed Sept. 30, 1968, and assigned to the assignee of the present application. This diffusion cell comprises a single piece of glass or other parent matrix material having a cavity area 52 disposed therein. Molten salt 40 is held in cavity 52 and metal ions from the salt diffuse into the surfaces 54 and 56 of the cylindrical diffusion cell 50. In another variation of this type of diffusion cell, FIGURE 12 shows an arrangement in which a bottom area 62 of a diffusion cell 60 as an optical surface generated during construction of the cell 60. After diffusion of metal cations into the surface 62, the peripheral portions may be removed to provide a lens having a diffused portion therein.

Figure 13:
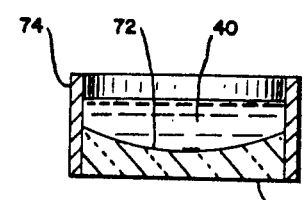

FIGURE 13 discloses another variation of a diffusion cell wherein a bottom portion 70 having a refractive surface 72 is treated in a salt bath 40 contained by a cylindrical refractory or metal ring 74. After treatment the ring is easily removed and optical body portion 70 is ground to form an optical element.

Figure 14A:
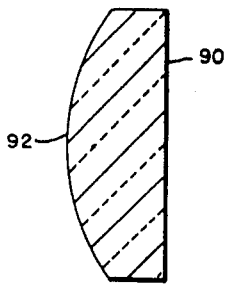
FIGURES 14a to 14c are cross-sectional views of a treated matrix for producing a positive spherical-type lens with plano surfaces.
Figure 14B:
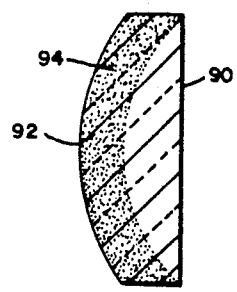
Figure 14C:
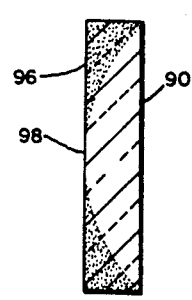

Using apparatus similar to that shown in FIGURES 9–13 numerous optical elements may be constructed. For instance in FIGURES 14a to 14c a glass preform 90 having a positive spherical surface 92 is treated by contacting surface 92 with molten silver halide salt to diffuse high-index silver ions 94 into the matrix a predetermined distance. By grinding and polishing parallel plano surfaces a power lens is obtained having portions 96 of high refractive index and portions 98 of low refractive index. The use of flat lenses in optical systems is advantageous from the standpoint of spacing between elements.

Figure 15A:
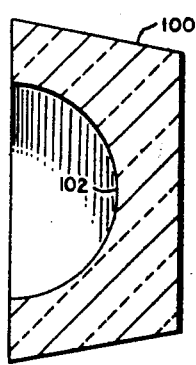
FIGURES 15a and 15c are cross-sectional views of an analogous lens of the toric-type, also having plano surfaces.
Figure 15B:
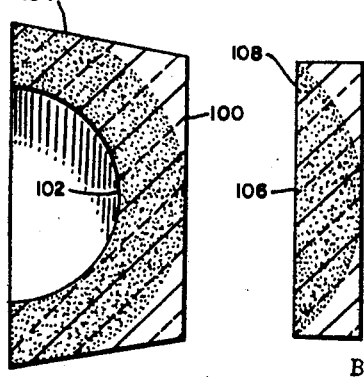
Figure 15C:
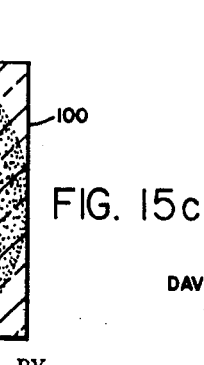

A toric-type lens may be manufactured by the method of this invention as shown by FIGURES 15a to 15c. A glass preform 100 has a cylindrical concave surface 102 formed by grinding or molding. Molten metal compounds may be contacted with surface 102 by placing the liquid in the cavity defined by surface 102 and diffusing metal ions into preform 100 along a cylindrical front to establish diffused zone 104. The lens is ground to a flat surface to form the toric-type lens having high-index portion 106 and low-index portion 108. The opposite surface of the lens may be ground flat or spherical to produce an ophthalmic lens.

Figure 16:
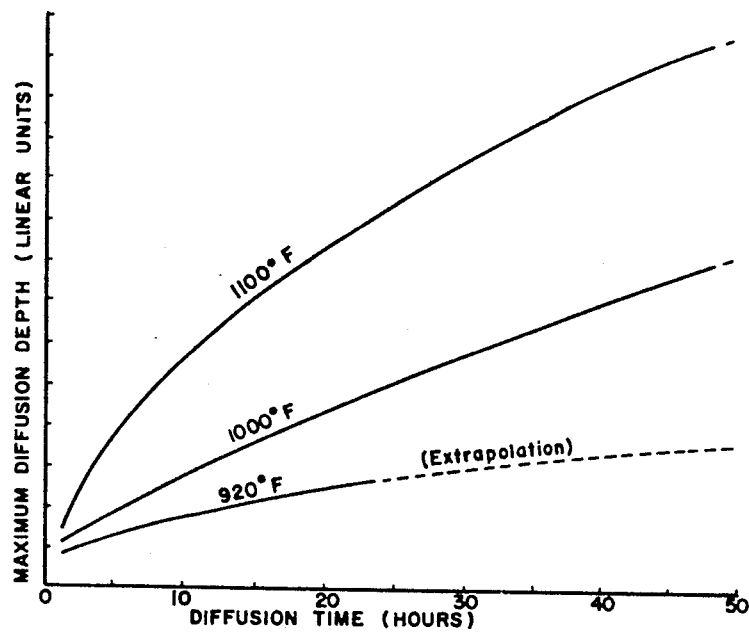
FIGURE 16 is a plot showing the effects of diffusion time and diffusion temperature on the depth of penetration of an index-changing material and FIGURE 17 shows the change in refractive index of a treated matrix in relation to diffusion depth.

FIGURE 16 shows the variation in maximum diffusion depth of silver cations into an alkali silicate glass with diffusion time using temperature as a parameter. The asymptotic curves in FIGURE 16 show that diffusion depth increases with contact time as would be expected and show that the rate of diffusion increases with treatment temperature.

Figure 17:
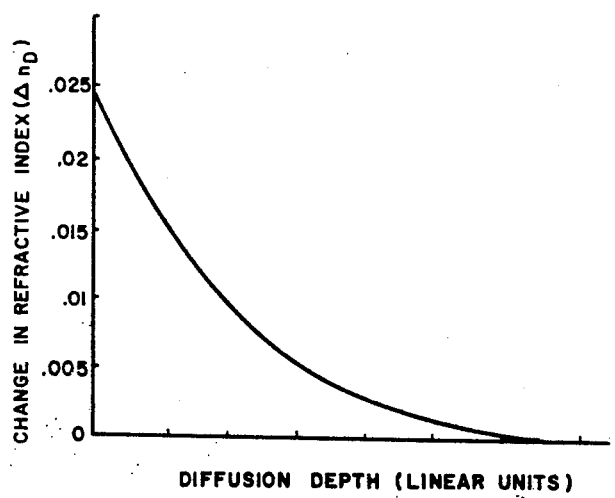

FIGURE 17 is a plot showing the relationship between refractive index and cation penetration or diffusion depth. This data relates to a diffusion process in which silver ions from a silver chloride molten salt at 1000° F. migrate into a matrix of a sodium silicate glass. The shape of the curve is approximately linear and shows the change in refractive index from the treated surface represented by zero diffusion depth inwardly to the point of maximum cation diffusion, where the refractive index of the parent glass is unchanged. Using similar plots for any given diffusant and matrix system the refractive index at a given surface depth may be predicted from a knowledge of the diffusion contact time and temperature for the particular system involved. While generally it is preferred to distribute the diffused material over a preformed optical refractive surface uniformly some variations in diffused surface composition and refractive index may be achieved by varying the contact time and temperature or composition of the diffusant material at the solid-liquid interface during the diffusion step.

While the preferred matrix material for use in the present invention is an optical glass such as alkali silicate of a borate glass having a typical composition of about 20 wt. percent $Na_2O$, 30 wt. percent $Al_2O_3$ and 50 wt. percent $B_2O_3$, any suitable inorganic matrix, such as sapphire may be used. Also, organic solids may be treated to alter the refractive index and reground to provide a refractive (non-homogeneous) surface. The requisite properties of a suitable matrix material is transparency to a given electromagnetic wave spectrum and diffusibility in a solid preform of the matrix material by an index-changing material.

I claim:

1. A gradient refractive index optical lens comprising a solid body of transparent glass type optical material initially having a uniform index of refraction;

said body having at least one major surface of predetermined initial optical configuration;

a gradient refractive index zone formed by diffusion of an index changing material radially inward from said surface, said zone being of uniform thickness and having a generally linear change in refractive index in the radial direction, approaching the uniform index of refraction of said body at the inner face of the zone;

said surface and zone having portions removed to form a final lens surface of different optical configuration, whereby variations in refractive index are present at different areas of said final lens surface.

2. The lens according to claim 1 in which said initial and final lens surfaces are different spherical curves, whereby the index of refraction varies concentrically from the center to the periphery of the lens, for correcting spherical aberration or coma.

3. The lens of claim 1 wherein said initial surface is aspheric and said final surface is flat, to form a Schmidt type optical plate.

4. The lens of claim 1, wherein said initial and final surfaces are flat, the final surface being angled with respect to the initial surface to form a multifocal ophthalmic lens with an increasing power toward its lower edge.

5. The lens of claim 1, wherein the initial surface is convex with a concave center portion and the final surface is convex, to form a multifocal ophthalmic lens with central and peripheral areas of different power.

6. The lens of claim 1, wherein the initial surface is a spherical curve and both final surfaces are flat, to act as a spherically curved lens with refractive power.

References Cited

UNITED STATES PATENTS

| | | | |
|---|---|---|---|
| 1,509,636 | 9/1924 | Bugbee | 351—169 |
| 2,290,911 | 7/1942 | Jones | 350—165 X |
| 2,344,250 | 3/1944 | Jones | 350—164 |
| 2,511,517 | 6/1950 | Spiegel. | |
| 2,547,416 | 4/1951 | Skellett. | |
| 3,212,401 | 10/1965 | Navias | 350—175 |

FOREIGN PATENTS 1,191,980  4/1965  Germany.

DAVID H. RUBIN, Primary Examiner

U.S. Cl. X.R.

65—30; 350—178, 200, 169, 177